(12) United States Patent  
Morita

(10) Patent No.: US 8,169,570 B2  
(45) Date of Patent: May 1, 2012

(54) LIQUID CRYSTAL DISPLAY DEVICE

(75) Inventor: Shin Morita, Ishikawa-ken (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 351 days.

(21) Appl. No.: 12/508,284

(22) Filed: Jul. 23, 2009

(65) Prior Publication Data

US 2010/0141874 A1    Jun. 10, 2010

(30) Foreign Application Priority Data

Dec. 8, 2008    (JP) .............................. P2008-312372

(51) Int. Cl.
  *G02F 1/1335*    (2006.01)
  *G02F 1/1343*    (2006.01)
(52) U.S. Cl. ........................................ 349/109; 349/146
(58) Field of Classification Search .......... 349/106–109, 349/139, 145–146
  See application file for complete search history.

(56) References Cited

U.S. PATENT DOCUMENTS

| 7,253,865 | B2 * | 8/2007 | Battersby ...................... 349/146 |
| 8,023,087 | B2 * | 9/2011 | Yamamoto et al. ........... 349/143 |
| 2008/0018557 | A1 * | 1/2008 | Maeda ............................ 345/55 |

FOREIGN PATENT DOCUMENTS

JP    2006-276359    10/2006

OTHER PUBLICATIONS

U.S. Appl. No. 12/649,772, filed Dec. 30, 2009, Morita.
U.S. Appl. No. 12/508,298, filed Jul. 23, 2009, Morita.

* cited by examiner

*Primary Examiner* — Dung T. Nguyen
(74) *Attorney, Agent, or Firm* — Oblon, Spivak, McClelland, Maier & Neustadt, L.L.P.

(57)    ABSTRACT

A liquid crystal display device having a non-rectangular display panel includes an active area which is defined by a peripheral shield layer. A plurality of pixels are formed in the active area in a matrix and typically each pixel includes a plurality of sub-pixels to display respective different colors. The pixels include a first pixel arranged in the peripheral region of the active area and a second pixel arranged at an inner region. A part of the first pixel located in a peripheral region of the active area is covered with the peripheral shield layer. The thickness of the color filter layer arranged in the first pixel where the peripheral shield layer overlaps with the first pixel is smaller than that of a same color filter arranged in the second pixel having a larger effective display area than that of the first pixel area.

23 Claims, 6 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2008-312372 filed Dec. 8, 2008, the entire contents of which are incorporated herein by reference.

BACKGROUND OF THE INVENTION

1. Field of the Invention

The present invention relates to a liquid crystal display device having a variant-shaped panel such as substantially an elliptical or circular shape, in which a peripheral region of a liquid crystal display panel is covered with a shield layer.

2. Description of the Background Art

Liquid crystal display devices are widely used as display devices for various kinds of equipments such as personal computers, OA equipments, and TV sets because the display devices have many advantages such as lightness, compactness and low power consumption. In recent years, the liquid crystal display device has also been used in mobile terminal equipments such as a mobile phone, a car navigation device, a game player, and a meter panel for automobiles.

Accordingly, a variety of panel shapes corresponding to applications such as a circular or an elliptical shape, but not limited to a conventional rectangular shape have been desired. For example, Japanese laid open patent application NO. P2006-276359 discloses a liquid crystal display device having a display panel formed in a substantially circular or elliptical shape, in which corner portions of respective array and color filter substrates that have a vertical long and rectangular shape, are cut down close to a display area to save display space.

On the other hand, in a color liquid crystal display device composed of pixels, each pixel includes, for example, red, green and blue sub-pixels. When a part of the sub-pixels composing the pixels is shielded by a housing, for example, a displayed color of the pixels may be off-balanced, which may result in a color display different from a predetermined one. For example, when only a part of the red sub-pixel is shielded, a transmittance or a reflection of the red color is reduced, which results in a difficulty of display color balance. In order to suppress such color shift, one proposal is to shield all the sub-pixels covered with a shield layer such as a black matrix layer. However, this has a drawback that the active area is reduced by the shield. Further, since edges of the active area are formed of dot patterns, smoothness of the edges of the active area in the circular or elliptical shape becomes impaired, which results in a bad image display.

BRIEF SUMMARY OF THE INVENTION

The present invention has been made to address the above mentioned problems.

Thus, according to one aspect of the invention, there is provided a liquid crystal display device including: a first substrate including switching elements provided for respective pixels; a second substrate facing the first substrate; a liquid crystal layer interposed between the first and second substrates; a peripheral shield layer defining an active area formed of the first and second substrates and the liquid crystal layer in a non-rectangular shape to display images; a first pixel arranged at a peripheral portion of the active area and partially overlapped by the peripheral shield layer; a second pixel located at an inner region of the active area and color filter layers arranged in the first and second pixels, respectively to display respective same colors, and wherein a thickness of a color filter layer arranged in the first pixel where the peripheral layer overlaps with the first pixel is smaller than that of a color filter layer arranged in the second pixel having a larger effective display area than that of the first pixel.

According to another aspect of the invention, there is provided a method for manufacturing a liquid crystal display device including an active area including a plurality of pixels to display images in a non-rectangular shape, the method including: providing first and second substrates interposed by a liquid crystal layer therebetween, the first substrate including switching elements provided respective pixels; forming a first pixel arranged at a peripheral portion of the active area; forming a second pixel located at an inner region of the active area; providing a peripheral shield layer arranged so as to overlap with a part of the first pixel and so as to define the active area; and forming color filter layers arranged in the first and second pixels, respectively to display respective same colors. Forming the color filter layers includes steps of forming colored resist layer on a surface of one of the substrates facing the liquid crystal layer and corresponding to the first and second pixels, respectively, forming a mask layer on the resist layer, patterning the mask layer to develop the colored resist layer, irradiating the resist layer through the mask layer, and developing the colored resist layer, wherein the thickness of the color filter layer arranged in an effective display area of the first pixel where the peripheral layer overlaps with the first pixel is smaller than that of the color filter layer arranged in the second pixel having a larger effective display area than that of the first pixel.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Figure 1:
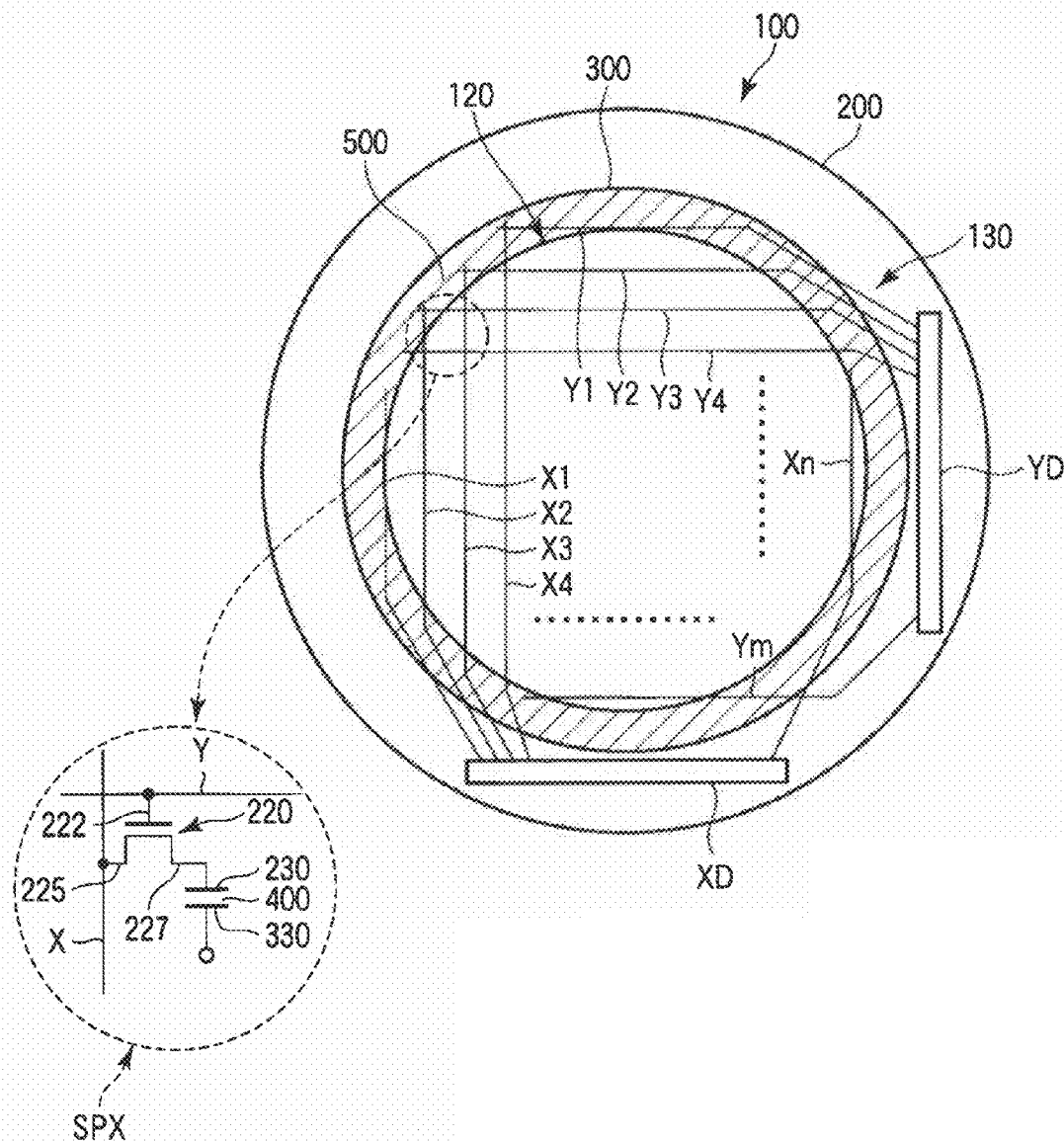
FIG. 1 is a schematic block diagram showing a liquid crystal panel of a liquid crystal display device according to a first embodiment of the invention.

A liquid crystal display device according to an exemplary embodiment of the present invention, in particular, a liquid crystal display device having a variant-shaped panel such as a substantially elliptical or circular shape, in which a peripheral region of the liquid crystal display panel is covered with a shield layer, will now be described with reference to the accompanying drawings wherein the same or like reference numerals designate the same or corresponding parts throughout the several views.

Figure 2:
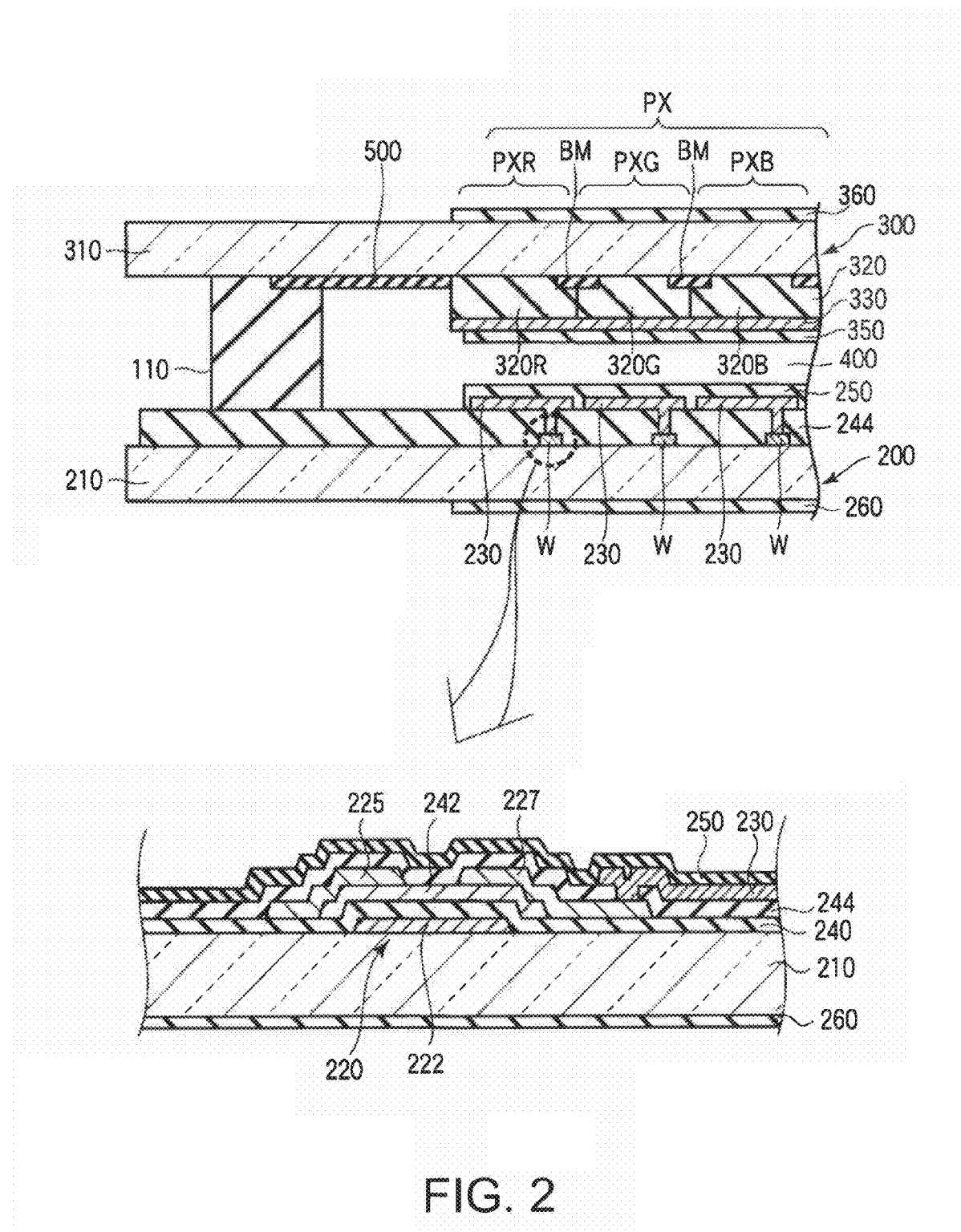
FIG. 2 is a cross-sectional view showing the liquid crystal display device shown in FIG. 1 according to the first embodiment of the invention.

As shown in FIGS. 1 and 2, a liquid crystal display device according to the invention includes a liquid crystal display panel 100. The liquid crystal display panel 100 is composed of a pair of substrates, e.g., an array substrate 200 (first substrate), and a counter substrate 300 (second substrate) and a liquid crystal layer 400 interposed therebetween. The liquid crystal display panel 100 includes an active area 120 in a variant shape.

In this embodiment, the liquid crystal display panel 100 includes a substantially circularly shaped active area 120. That is, the liquid crystal display panel 100 is substantially circularly shaped, and the array substrate 200 and the counter substrate 300 that form the liquid crystal display panel 100 are also substantially circularly shaped. The array substrate 200 and the counter substrate 300 are attached by a seal element 110 and maintain a predetermined gap to hold the liquid crystal layer 400 therebetween. The liquid crystal layer 400 is formed of liquid crystal molecules injected into the gap. The active area 120 is located inside of the sealed portion by the seal element 110. In this embodiment, the active area 120 is composed of a plurality of pixels. Particularly, a color liquid crystal display device is provided, in which each pixel is formed of a plurality of sub-pixels PXR. For example, each pixel PX is formed of red sub-pixel PXR, green sub-pixel PXG and blue sub-pixel PXB.

The array substrate 200 is formed of a circular shaped insulating substrate 210 such as a glass substrate with transmissive characteristic. The array substrate 200 includes a plurality of gate lines Y (1, 2, 3, . . . , m) extending in a row direction of the pixels arranged in a matrix, a plurality of source lines X (1, 2, 3, . . . , n) extending in a column direction of the pixels arranged in a matrix, switching elements 220 located at intersections crossing with the source and gate lines, and picture electrodes arranged in each of the pixels PX in the active area 120.

The gate lines Y are located on the insulating substrate 210 and the source lines X are arranged so as to cross with the gate lines Y with an interposed gate insulating layer 240. The gate lines Y and the source lines X are made of conductive material such as Molybdenum (Mo), Tungsten (W) and Aluminum (Al).

Each of the gate lines Y in the active area 120 is extracted to a peripheral portion 130 and is connected to a gate driver YD as a signal source. Each source lines X is also extracted to the peripheral portion and is connected to a source driver XD as a signal source. The switching element 220 is, for example, formed of a thin film transistor (TFT). A gate electrode 222 of the switching element 220 is arranged on the insulating substrate 210 with the gate line Y, and is connected to the gate line Y (or the gate electrode 222 is integrally formed with the gate line Y). The gate line Y and the gate electrode 222 are covered with a gate insulating layer 240, which is, for example, made of silicon nitride (Si3 N4).

A semiconductor layer 242 of the switching element 220 is arranged on the gate insulating layer 240 facing the gate electrode 222. The semiconductor layer 242 is, for example, made of amorphous silicon or poly-silicon. Source electrode 225 and drain electrode 224 are arranged on the gate insulating layer 240 with the source line X. The source electrode 225 is connected to the source line X or is integrally formed of the source line X, and contacts with the semiconductor layer 242. The drain electrode 227 is connected to the pixel electrode 230 and contacts with the semiconductor layer 242. The source electrode 225 and the drain electrode 224 may be manufactured by the same process and the same material, and are covered with a passivation layer 244 such as silicon nitride (Si3 N4) layer. The picture electrode 230 is arranged on the passivation layer 244 facing the pixel PX. The picture electrode 230 is connected to the drain electrode 227 of the switching element 220 through a contact hole formed in the passivation film 244.

In a transmission mode liquid crystal display panel, in which a picture is displayed by selectively transmitting light from a backlight unit provided at a rear side of the liquid crystal display panel, the picture electrode 230 is made of conductive and transmissive material such as Indium Tin Oxide (ITO) or Indium Zinc Oxide (IZO). On the other hand, in a reflective mode liquid crystal display panel, in which a picture is displayed by selectively reflecting light that penetrates from outside, the picture electrode 230 is made of reflective material such as Aluminum (Al) or Molybdenum (Mo).

The surface of the array substrate 200 is covered with an alignment film 250 to control an alignment of liquid crystal molecules contained in the liquid crystal layer 400. The counter substrate 300 is formed of an insulating substrate 310 with a substantially circular shape and transmissive characteristic such as a glass substrate. The counter substrate 300 includes a black matrix BM facing wiring regions W such as the gate lines, source lines X and switching elements 220, and a color filter layer 320 arranged so as to face sub-pixels in the active area 120.

The black matrix BM, made of a black colored resin film is formed on the insulating counter substrate 310 in a matrix shape. Alternatively, the black matrix BM is formed of a metallic layer having light blocking characteristic, such as chromium Cr. The color filter layer 320 is arranged in an effective region surrounded by the black matrix BM. The color filter layer 320 is composed of three types of colored resins such as red color resin (R), green colored resin (G) and blue colored resin(B). A red color filter layer 320R is arranged in the red color sub-pixel PXR so as to transmit red color. A green color filter layer 320G is arranged in the green color sub-pixel so as to transmit the green color. Similarly, a blue color filter layer 320B is arranged in the blue color sub-pixel PXB so as to transmit the green color. The color filter layers (R, G, B) may be formed on the array substrate 200.

The counter substrate 300 includes a peripheral shield layer 500 arranged in a peripheral region in the active area. The peripheral shield layer 500 is, for example, formed of a black colored resin and may be formed of the same material and the same process as the black matrix BM.

A common electrode 330 to supply a voltage difference to the liquid crystal display layer 400 between the picture electrode 230 may be formed on the counter substrate 300 or the array substrate 200. The common electrode 330 is made of conductive material with a transmissive characteristic such as ITO.

In the embodiment shown in FIG. 2, a vertical mode in which a vertical electric field, e.g., an electric field that is vertical with reference to the main surface of the substrate, is used. The common electrode 330 is commonly arranged on the common substrate 300 so as to face a plurality of picture electrodes 230 interposing the liquid crystal layer 400 therebetween. Further, in a lateral electric mode, in which an electric field that is in parallel with the main surface of the substrate is used to control a switch operation of the liquid crystal layer 400, the common electrode 330 is arranged on the same array substrate 200 as the picture electrode 230 so as to laterally face the picture electrode 230 with isolation therebetween.

The surface of the counter substrate 300 is covered with an alignment film 350 to control the alignment of the molecules contained in the liquid crystal layer 400. In the reflective mode liquid crystal display panel 100, optical elements 360 are provided on the outer surface of the counter substrate 300. On the other hand, in the transmissive mode liquid crystal display device, optical elements 260 and 360 are arranged on the array substrate 200 and the counter substrate 300, respectively. The optical elements 260 and 360 include polarizers in which a polarizing direction is set so as to fit the characteristic of the liquid crystal layer 400. A retardation film may be used, as needed.

In the liquid crystal display device including the transmissive mode liquid crystal display panel 100, a back light unit is provided at the rear side of the liquid crystal display panel 100 to illuminate the display panel 100.

In the above-mentioned liquid crystal display panel 100 including the active area 120 with a non-rectangular shape, a peripheral shield layer 500 is arranged so as to define the active area 120. In the first embodiment shown in FIG. 2, the shield layer 500 is arranged at a peripheral portion of the active area 120 in an internal surface of the counter substrate 300 facing the array substrate 200. The peripheral shield layer 500 is made from a black colored resign or a light blocking metallic material such as chromium Cr. The peripheral shield layer 500 may be formed of the same material as the black matrix BM using the same process, simultaneously.

The peripheral shield layer 500 may be arranged on an outer surface of the counter substrate 300 and define an aperture so as to circumscribe the active area 120.

Figure 3:
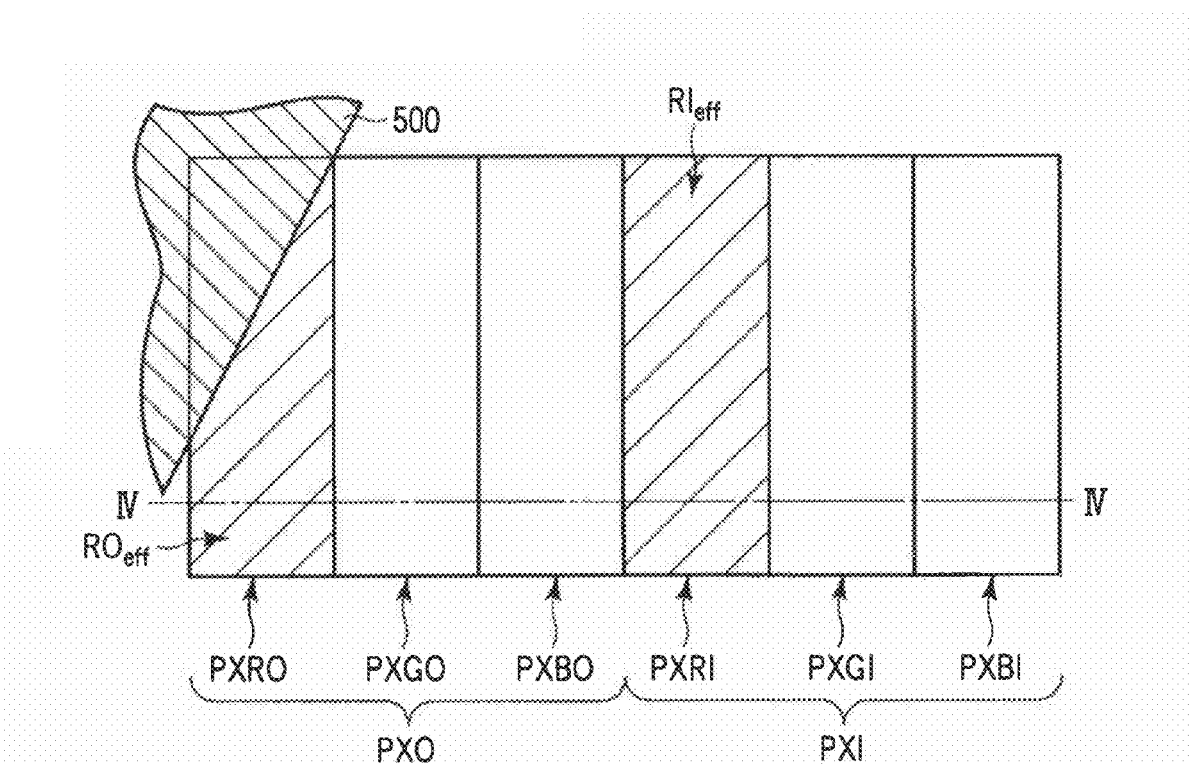
FIG. 3 is a plan view showing a structure of a peripheral pixel and an internal pixel shown in FIG. 1 according to the first embodiment of the invention.
Figure 4:
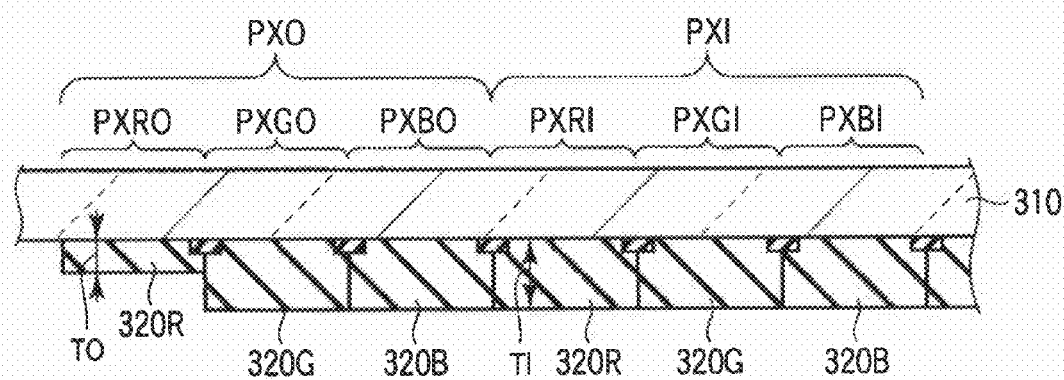
FIG. 4 is a cross-sectional view showing a structure taken a line IV-IV of color filter layers formed on a counter substrate in a peripheral pixel and an internal pixel shown in FIG. 3 according to the first embodiment of the invention.

As shown in FIGS. 3 and 4, in the above-mentioned liquid crystal display panel 100, the liquid crystal display panel 100 includes pixels PX located at the peripheral portion of the active area 120 in a substantially circular shape. Some pixels PXO located at the peripheral portion of the active area 120 overlap with the peripheral shield layer 500. The peripheral pixel PXO is composed of red sub-pixel PXRO, green sub-pixel PXGO and blue sub-pixel PXBO. On the other hand, internal pixels PXI located inside the peripheral pixels PXO in the active area 120 are composed of three sub-pixels, e.g., red sub-pixel PXRI, green sub-pixel PXGI and blue color sub-pixel PXBI. In the peripheral pixels and internal pixels, respective sub-pixels of same color, for example, red pixels PXRO and PXRI are formed so as to have the same area and are provided with red filter layers 320 R, respectively. Other color filter layers 320 G and 320 B are formed on the sub-pixels PXGO, PXBO in the peripheral pixels PXO and on the sub-pixels PXGI, PXBI in the internal pixels PXI, respectively. The color filter layers 320 (R, G, B) are formed on the inner surface of the counter substrate 310 for all pixels as shown in FIG. 4.

Next, an arrangement according to this embodiment is described in more detail, referring to the case the peripheral shield layer 500 overlaps with a part of the sub-pixels of the peripheral pixels PXO, in particular where the peripheral shield layer 500 overlaps with a part of the red sub-pixel PXRO of the peripheral pixels PXO. An effective display area ROeff of the red sub-pixel PXRO of the peripheral pixel PXRO, in which the peripheral shield layer 500 overlaps with a part of the red sub-pixel PXRO, is smaller than an effective display area RIeff of the red sub-pixel PXRI in the internal sub-pixel PXI.

That is, a difference between the effective display areas ROeff and RIeff corresponds to an area where the peripheral shield layer 500 overlaps with a part of the red color sub-pixel PXRO. Here, the effective display area means a substantial active area where a non-transmissive wiring regions such as the gate lines and source lines, and the black matrix region are subtracted from a total active area. That is, the effective display area of the transmissive mode liquid crystal display panel corresponds to the area where light from the back light unit is transmitted in the liquid crystal layer. On the other hand, the effective display area of the reflective mode liquid crystal display panel corresponds to the area where light from outside is reflected in the active area as a light source.

Accordingly, if the color filter layer 320R arranged in the effective display areas of the red sub-pixels PXRO and PXR1 are formed so as to have the same construction, for example, the same thickness of the color filter layer, the red sub-pixel PXRO becomes darker than the red sub-pixel PXR1. That is, in case of a transmissive mode liquid crystal display panel, the transmissivity of the red sub-pixel PXRO becomes lower than that of the red sub-pixel PXR1. On the other hand, in case of the reflective mode liquid crystal display panel, the reflectivity of the red sub-pixel PXRO also becomes lower than that of the red sub-pixel PXR1.

According to this embodiment, the thickness of the color filter layer 320 arranged in an effective display area ROeff of the red sub-pixel PXRO, which partially overlaps with the peripheral shield layer 500 in the peripheral pixels PXO, is smaller than that of the color filter layer 320 on the effective display area RIeff of the sub-pixel PXRI of the same color in the internal pixels PXI. In more detail, the thickness T0 of the color filter layer 320 R arranged in the effective display area ROeff of the red sub-pixel PXRO in the peripheral pixels PXO is smaller than the thickness T1 of the color filter layer 320 R arranged in the effective display area RIeff of the red sub-pixel PXRI in the internal pixel PXI.

According to this embodiment, a relationship between the light transmissivity and the thickness of the color filter layer is exploited. That is, the transmissivity of the color filter layer becomes inversely higher with the thickness of the color filter layer. Therefore, the respective thickness of the color filter layers 320R formed on the red sub-pixels PXRO and PXRI is set so as to compensate the difference in light transmission between the red sub-pixels PXRO and PXRI caused by the difference of areas between the effective display areas ROeff and RIeff.

According to this embodiment, it becomes possible to make each of the sub-pixels of the peripheral pixels PXO having substantially the same transmissivity and reflectance as that of each of sub-pixels of the internal pixels PXI, which results in the same color balance for the peripheral pixels PXO and the internal pixels PXI. As a consequence, a high quality display for the entire active area 120 including the peripheral pixel region can be obtained.

In this embodiment, the peripheral pixels PXO contribute to the display, contrary to the case where all the pixels overlapped with the peripheral shield layer 500 are shielded, therefore an influence to the display quality by a decrease in the active area can be avoided. Further, it become possible to improve the display quality by making the edge of the peripheral portion of the active area 120 smooth, which results in a natural display regardless of the shield. Particularly, when forming an active area 120 in a substantially circular or elliptical shape, the edge of the active area 120 becomes a round shape. Even in such case, it becomes possible to make the edge of the active area 120 smooth. Therefore, there can be provided a variety of shapes of active areas 120 with a high display quality which meets many applications.

In the embodiment shown in FIGS. 3 and 4, the case where the peripheral shield layer 500 covers only the red sub-pixel is explained. However, the above construction may be applied to the case where the peripheral shield layer 500 overlaps with other sub-pixels.

Figure 5:
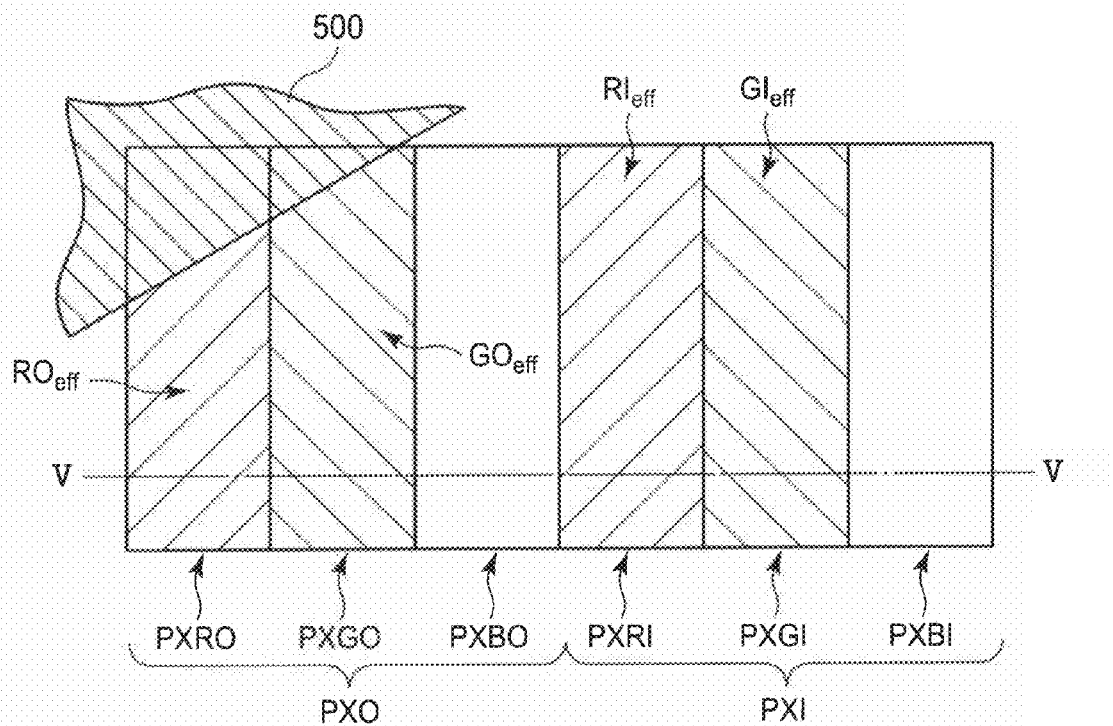
FIG. 5 is a plan view showing a structure of a peripheral pixel and an internal pixel shown in FIG. 1 according to a second embodiment of the invention.
Figure 6:
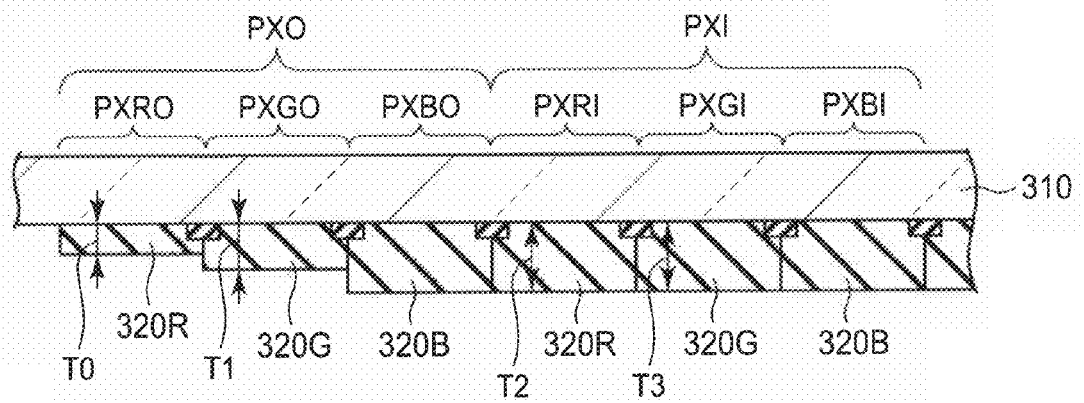
FIG. 6 is a cross-sectional view showing a structure taken a line V-V of the color filter layers formed on a counter substrate in the peripheral pixel and in the internal pixel shown in FIG. 5 according to the second embodiment of the invention.

FIG. 5 and FIG. 6 show a second embodiment in which a red sub-pixel PXRO and a green sub-pixel PXGO are covered with the peripheral shield layer 500. An effective display area GOeff of the green sub-pixel PXGO of the peripheral pixel PXO, where the peripheral shield layer 500 covers the green sub-pixel PXGO, is larger than the effective display area ROeff of the red sub-pixel PXRO of the peripheral pixel PXO, but is smaller than the effective display area RIeff of the red color sub-pixel PXRI and the effective display area GIeff of the green sub-pixel PXGI in the inner pixel PXI.

According to this embodiment, in the sub-pixels overlapped with the peripheral shield layer 500, a thickness T1 of the green filter layer 320G arranged in the effective display area GOeff is larger than the thickness T0 of the red filter layer 320R of the red sub-pixel PXRO of the peripheral pixel PXO. Thicknesses T2 and T3 of the color filters 320 R and 320 G on the red sub-pixel PXRI and the green sub-pixel PXRI are larger than the thickness T1, T0 of the sub-pixels PXRO and PXGO. Therefore, the respective thickness of the color filter layers 320 is set so as to compensate for the difference in light transmission between the red sub-pixel PXRO, the green sub-pixel PXGO and other sub-pixels PXRI and PXGI caused by the differences among the effective display area ROeff of the red sub-pixel PXRO, the effective display area GOeff of the green sub-pixel PXGO, and the effective display areas RIeff and GIeff of the red sub-pixel PXRI and the green sub-pixel PXGI in the internal pixel PXI.

In order to form the color filter layers for the peripheral pixels PXO and the central pixel PXI having thicknesses different from each other, a positive type photo-resist which is removed by a development process after light irradiation is used. For example, a gray-tone mask (GTM) or a half-tone mask (HTM) may be used to form the color filter layers simultaneously having different thickness. That is, photoresist layers having different development characteristics are selectively formed in the peripheral pixels PXO and inner pixels PXI. A mask pattern having a characteristic in which the transmissivity is zero (e.g., 100% shield), is formed in the inner pixels PXI. On the other hand, another mask pattern having a characteristic in which the transmissivity is set at a value, higher than zero but below than 100%, is formed in the peripheral pixels PXO to form color filter layers with different thickness corresponding to the effective display area.

First, after forming a photoresist layer made from light sensitive resin, for example, the gray tone mask (GTM) is used to selectively develop the photoresist layers for the peripheral pixels PXO and the central pixel PXI, that is, in order to make two types of developed resist layers having different developed extent corresponding to the peripheral pixels PXO and the central pixels PXI, respectively. The light does not penetrate to the photoresist layer on the internal pixels PX. On the other hand, the photoresist layer in the peripheral pixels PXO is developed corresponding to the transmissiveness of the mask and becomes fusible by a developer. Then, two types of color filter layers having different thickness are formed after a drying process. Consequently, color filter layers having different thickness for sub-pixels in the peripheral pixels PXO and in the internal pixels PXI are simultaneously formed.

Figure 7:
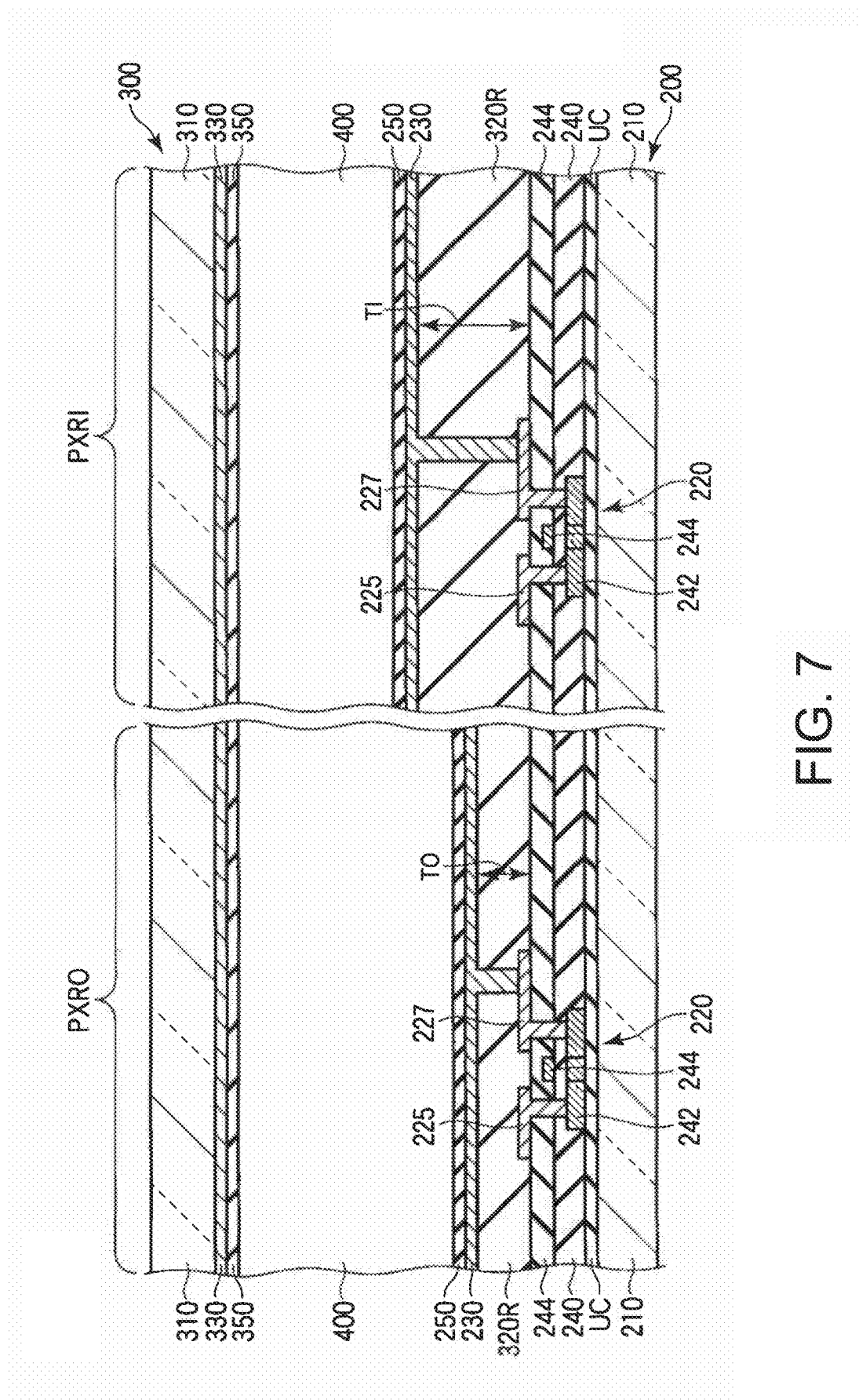
FIG. 7 is a cross-sectional view showing a relation ship of thickness of the color filter layers formed on an array substrate between in the peripheral pixel and in the internal pixel according to the first embodiment.

In the example shown in FIG. 3, though the color filter layers 320 (R, G, B) are arranged on the counter substrate 300 facing the array substrate 200, the embodiment is not limited to this example, but may be formed on the array substrate 200 facing the counter substrate 300 (e.g., color filter on array: COA) as shown in FIG. 7

An undercoat layer UC is formed on an insulating substrate 210. The undercoat layer UC is, for example, formed of inorganic material such as silicon-oxide film or silicon-nitride film. A semiconductor layer 242 in a switching transistor 220 is arranged on the undercoat layer UC. The semiconductor layer is, for example, formed of a poly-silicon layer.

The undercoat layer UC and the semiconductor layer 242 are covered with a gate insulating layer 240. A gate electrode 222 of the switching transistor 220 is arranged on the gate insulating layer 240 facing the semiconductor layer 242. The gate electrode 222 and the gate insulating layer 240 are covered with a passivation layer 244. A source electrode 225 and a drain electrode 227 of the switching transistor 220 are arranged on the passivation layer 244 and contact with the source and drain regions in the semiconductor layer 242 through respective contact holes which penetrate the gate insulating layer 240 and the passivation layer 244.

The color filter layers (R, G, B) are arranged so as to cover the switching transistor 220. That is, the source electrode 225, the drain electrode 227 of the switching transistor 220 and the passivation layer 244 are covered with the color filter layer 320 (R, G, B). A picture electrode 230 is arranged on the color filter layer 320 and connected to the drain electrode 227 of the switching transistor 220 via through hole which penetrates the color filter layer 320. That is, the color filter layers 320 (R, G, B) are arranged between the switching transistor 220 and the picture electrode 230.

In this example which uses the COA construction, a sub-pixel overlapped with the peripheral shield layer 500 in the peripheral pixels PXO is made so that the thickness of the color filter layer 320 is smaller than that of the sub-pixel of the same color in the inner pixels PXI. In the example shown in FIG. 7, a thickness T0 of the red color filter layer 320R arranged on the red color sub-pixel PXRO is small than the thickness TI of the red filter layer 320R arranged on the red sub-pixel PXRI. Accordingly, a decrease in the light transmission in the peripheral pixels PXO caused by the shield layer 500, is compensated. Further, the difference of the light transmission between the peripheral pixels PXO and the central pixel PXI is suppressed. Accordingly, it becomes possible to adjust the color balance of the peripheral pixels PXO to that of the inner pixels PX.

As mentioned-above, the gap between the alignment layers 250 and 350 to hold the liquid crystal layer 400 in a sub-pixel of peripheral pixels PXO is different from that of same color sub-pixel in the inner pixel PXI caused by the difference of the thickness of the color filter layers.

Figure 8:
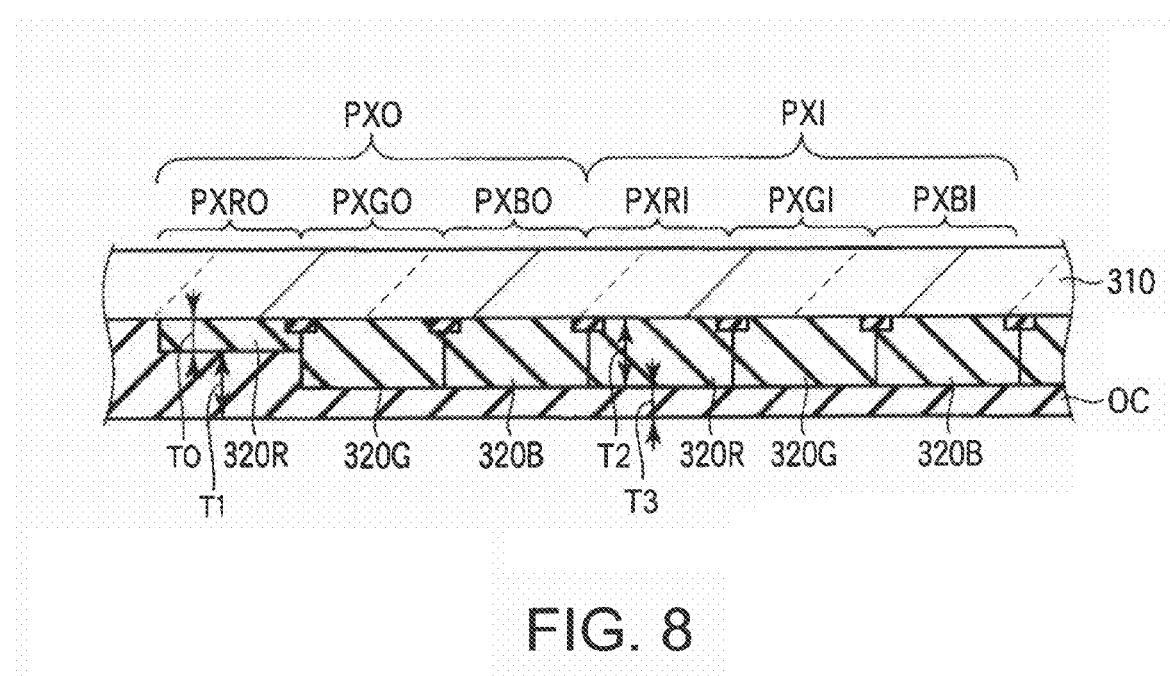
FIG. 8 is a cross-sectional view showing a relation ship of thickness of a color filter layer and an overcoat layer between in the peripheral pixel and in the internal pixel according to a third embodiment.

FIG. 8 shows a third embodiment according to the present invention. It is desirable to form an organic insulating layer as an overcoat layer on the surface of the color filter layer to planarize the surface. It is necessary to select a sufficiently transparent insulating material which does not adversely influence to a color display. That is, as shown in FIG. 8, the substantially flat overcoat layer OC made of an organic layer is formed on the color filter layer 320 by coating an organic resin with a low viscosity using a spin coat method and then heating the resin. For example, a thickness T0 of the color filter layer 320R formed in the red sub-pixel PXRO of the peripheral pixels PXO is smaller than the thickness T2 arranged on the red sub-pixel PXRI of the inner pixels PXI, and a thickness T1 of the overcoat layer OC formed on the red color sub-pixel PXRO is larger than a thickness T3 of the overcoat layer on the red sub-pixel PXRI.

In the case the color filter layer 320 is provided in the counter substrate 320 as shown in FIG. 8, the transparent organic insulating layer OC is arranged between the color filter layer 320 and the counter electrode 330, or an alignment layer 350. On the other hand, in the case the color filter layer 320 is arranged on the array substrate 200, the transparent organic insulating layer OC is arranged between the color filter layer 320 and the picture electrode 230, or an alignment layer 250.

Accordingly, it becomes possible to make a constant gap between the alignment films 250 and 350 for the pixels of the entire active area of the panel, which results in the suppression of a display defect due to a localized gap difference.

According to the present invention, the same color balance for the peripheral pixels and the internal pixels can be obtained in a liquid crystal display panel having a substantially circular or elliptical shape. Therefore, there can be provided a high quality liquid crystal display device with a variety of shapes for many applications, such as a meter display for automobiles.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed herein.

What is claimed is:

1. A liquid crystal display device comprising:
   a first substrate including switching elements provided for respective pixels;
   a second substrate facing the first substrate;
   a liquid crystal layer interposed between the first and second substrates;
   a peripheral shield layer defining an active area formed of the first and second substrates and the liquid crystal layer in a non-rectangular shape to display images;
   a first pixel arranged at a peripheral portion of the active area and partially overlapped by the peripheral shield layer;
   a second pixel located at an inner region of the active area; and
   color filter layers arranged in the first and second pixels, respectively, to display the same respective colors, and
   wherein a thickness of a color filter layer arranged in the first pixel where the peripheral layer overlaps with the first pixel is smaller than that of a color filter layer arranged in the second pixel having a larger effective display area than that of the first pixel.

2. The liquid crystal display device according to claim 1, wherein the active area is formed in a substantially circular or elliptical shape.

3. The liquid crystal display device according to claim 1, wherein the color filter layer is arranged on the second substrate facing the first substrate.

4. The liquid crystal display device according to claim 3, further comprising:
   a black matrix layer to partition the pixels,
   wherein the peripheral shield layer is formed of the same material as the black matrix layer.

5. The liquid crystal display device according to claim 1, wherein the color filter layer is arranged on the first substrate facing the second substrate.

6. The liquid crystal display device according to claim 5, wherein each of the pixels includes a picture electrode connected to the switching element, and the color filter layer is arranged between the switching element and the picture electrode.

7. The liquid crystal display device according to claim 1, further including an organic insulating layer arranged on a surface of the color filter, wherein a thickness of the organic insulating layer arranged on a surface of the effective display area in the first pixel is larger than that of the organic insulating layer arranged on a surface of the effective display area in the second pixel.

8. A liquid crystal display device comprising:
   a first substrate including switching elements provided for respective pixels;
   a second substrate facing the first substrate;
   a liquid crystal layer interposed between the first and second substrates;
   a peripheral shield layer defining an active area formed of the first and second substrates and the liquid crystal layer in a non-rectangular shape to display images;
   a first pixel arranged at a peripheral portion of the active area;
   a second pixel located at an inner region of the active area; and
   said peripheral shield layer arranged so as to overlap with a part of the first pixel; and
   color filter layers arranged in the first and second pixels, respectively to display the same respective colors, and
   wherein each of the first and second pixels includes first, second and third sub-pixels to display respective different colors,
   the peripheral shield layer overlaps with the first sub-pixel of the first pixel arranged at the peripheral portion of the active area,
   the thickness of a color filter layer arranged in the first sub-pixel of the first pixel where the peripheral shield layer overlaps with the first sub-pixel is smaller than that of a color filter layer arranged in the first sub-pixel of the second pixel, and
   respective first sub-pixels of the first and second pixels display the same color.

9. The liquid crystal display device according to claim 8, wherein the first, second and third sub-pixels of the first and second pixels are red, green and blue sub-pixels.

10. The liquid crystal display device according to claim 8, wherein the active area is formed in a circular or elliptical shape.

11. The liquid crystal display device according to claim 8, wherein the color filter layer is arranged on the first substrate facing the second substrate, and the color filter layer is arranged between the switching elements and a picture electrode.

12. The liquid crystal display device according to claim 8 further including organic insulating layers arranged on a surface of the color filter layers, wherein a thickness of the organic insulating layer arranged in the first sub-pixel in the first pixel is larger than that arranged in the first-sub pixel in the second pixel.

13. A liquid crystal display device comprising:
a first substrate including switching elements provided to each pixel;
a second substrate facing the first substrate;
a liquid crystal layer interposed between the first and second substrates;
a peripheral shield layer defining an active area formed of the first and second substrates and the liquid crystal layer in a non-rectangular shape to display images;
a first pixel arranged at a peripheral portion of the active area;
a second pixel located at an inner region of the active area; and
said peripheral shield layer arranged so as to overlap with a part of the first pixel; and
color filter layers arranged in the first and second pixels, respectively to display the same respective colors, and
wherein each of the first and second pixels includes first, second and third sub-pixels to display respective different colors, and the peripheral shield layer overlaps with the first and second sub-pixels in the first pixel arranged at the peripheral portion of the active area,
the thickness of a color filter layer arranged in the first sub-pixel of the first pixel where the peripheral shield layer overlaps with the first sub-pixel is smaller than that of a color filter layer arranged in the first sub-pixel of the second pixel, and respective first, second and third sub-pixels of the first and second pixels display same colors, and
the thickness of a color filter layer arranged in the first and second sub-pixels of the first pixel where the peripheral shield layer overlaps with the first and second sub-pixel is smaller than those of the color filter layers arranged in the first and second sub-pixels in the second pixel, respectively, and the thickness of the second sub-pixel is larger than that of the first sub-pixel in the first pixel.

14. The liquid crystal display device according to claim 13, wherein
the first, second and third sub-pixels of the first and second pixels are red, green and blue sub-pixels, respectively.

15. The liquid crystal display device according to claim 13, wherein the active area is formed in a circular or elliptical shape.

16. The liquid crystal display device according to claim 13, further including organic insulating layers arranged on a surface of the color filter layers, wherein a thickness of the organic insulating layers arranged in the first and sub-pixels in the first pixel is larger a thickness of the organic insulating layer arranged in the first and second sub-pixels in the second pixel.

17. A method for manufacturing a liquid crystal display device comprising an active area including a plurality of pixels to display images in a non-rectangular shape, said method comprising:
providing first and second substrates interposed by a liquid crystal layer therebetween, the first substrate including switching elements provided for respective pixels;
forming a first pixel arranged at a peripheral portion of the active area;
forming a second pixel located at an inner region of the active area;
providing a peripheral shield layer arranged so as to overlap with a part of the first pixel and the peripheral shield layer defining the active area; and
forming color filter layers arranged in the first and second pixels, respectively to display respective same colors; and
wherein forming the color filter layers includes,
forming colored resist layer on a surface of one of the substrates facing the liquid crystal layer and corresponding to the first and second pixels, respectively,
forming a mask layer on the resist layer,
patterning the mask layer to develop the colored resist layer,
irradiating the resist layer through the mask layer,
developing the colored resist layer, and
wherein the thickness of the color filter layer arranged in an effective display area of the first pixel where the peripheral layer overlaps with the first pixel is smaller than that of the color filter arranged in the second pixel having a larger effective display area than that of the first pixel.

18. The method for manufacturing a liquid crystal display device according to claim 17, wherein the active area is formed in a circular or elliptical shape.

19. The liquid crystal display device according to claim 17, further including organic insulating layers arranged on a surface of the color filter layers, wherein a thickness of the organic insulating layer arranged in a first sub-pixel in the first pixel is larger than that arranged in a first-sub pixel in the second pixel.

20. The method for manufacturing a liquid crystal display device according to claim 17, wherein the color filter layer is arranged on the first substrate facing the second substrate, and the color filter layer is arranged between the switching elements and a picture electrode.

21. The method for manufacturing a liquid crystal display device according to claim 17, wherein the peripheral shield layer is formed of the same material as a black matrix layer used to partition the pixels.

22. The method for manufacturing a liquid crystal display device according to claim 17, wherein the mask layer is a half-tone mask.

23. The method for manufacturing a liquid crystal display device according to claim 17, wherein the mask layer is a gray-tone mask.

* * * * *